United States Patent [19]

Iwaisako et al.

[11] 4,120,943

[45] Oct. 17, 1978

[54] PROCESS FOR PRODUCING PSEUDO-BOEHMITE

[75] Inventors: Toshiyuki Iwaisako; Naomi Yamaguchi; Hisao Yomogida; Yoshinobu Ito, all of Tokyo, Japan

[73] Assignee: Asahi Kasei Kogyo Kabushiki Kaisha, Osaka, Japan

[21] Appl. No.: 751,683

[22] Filed: Dec. 17, 1976

Related U.S. Application Data

[63] Continuation-in-part of Ser. No. 683,520, May 5, 1976, abandoned, which is a continuation of Ser. No. 456,389, Mar. 29, 1974, abandoned.

[30] Foreign Application Priority Data

Apr. 6, 1973 [JP] Japan .................................. 48/38774

[51] Int. Cl.$^2$ .......................... C01F 7/02; C01F 7/34
[52] U.S. Cl. .................................. 423/628; 423/630; 252/463; 106/288 B
[58] Field of Search ........................ 423/625, 628, 630

[56] References Cited

U.S. PATENT DOCUMENTS

| | | | |
|---|---|---|---|
| 1,951,718 | 3/1934 | Ziese et al. | 423/625 |
| 3,025,132 | 3/1962 | Innes | 423/213.2 X |
| 3,124,418 | 3/1964 | Malley et al. | 423/625 |
| 3,133,029 | 5/1964 | Hoekstra | 423/213.2 X |
| 3,352,636 | 11/1967 | Wilson et al. | 423/630 |
| 3,630,670 | 12/1971 | Bell et al. | 423/626 |
| 3,739,062 | 6/1973 | Barsotti | 423/625 |
| 3,773,691 | 11/1973 | Leach | 423/625 |
| 3,864,461 | 2/1975 | Miller et al. | 423/628 |
| 3,981,979 | 9/1976 | Brarthwaite et al. | 423/628 |

FOREIGN PATENT DOCUMENTS 43-30180  12/1968  Japan ...................................... 423/630

*Primary Examiner*—Herbert T. Carter
*Attorney, Agent, or Firm*—Cooper, Dunham, Clark, Griffin & Moran

[57] ABSTRACT

Pseudo-boehmite having a bulk density of about 0.05 to 0.2 g/cc, an oil absorption of about 2.5 to 6.0 cc/g, a pore volume of about 2.0 to 7.0 cc/g over a pore diameter range of 176µ to 0.0035µ and a specific surface area of about 200 to 500 m$^2$/g, and a process for producing the same; useful as a filler, an absorbent, a catalyst, a filtering agent and a base material for composites; prepared by mixing alkali aluminate and halohydrin together at a low temperature, heating for reaction the resulting mixture, cooling the reacting solution, separating the resulting precipitate by filtration and, if desired subjecting the precipitate to washing with an organic solvent followed by drying.

10 Claims, 6 Drawing Figures

PROCESS FOR PRODUCING PSEUDO-BOEHMITE

RELATED APPLICATIONS

This application is a continuation-in-part application of copending application, Ser. No. 683,520 filed May 5, 1976, which is in turn a continuation of copending application, Ser. No. 456,389, filed Mar. 29, 1974, both now abandoned.

BACKGROUND OF THE INVENTION

This invention relates to novel pseudo-boehmites having excellent dispersibility and to processes for their production.

More particularly, the present invention is concerned with a pseudo-boehmite in the form of a thin film which is bulky and further characterized as having large pore volumes, large surface areas, and excellent dispersibility. It is concerned also with processes for the production of such products.

Methods and improvements in methods of producing alumina having a pseudo-boehmite structure from an alkali aluminate are known. In the best known method, an aqueous solution of alkali aluminate is neutralized with mineral acid to effect a continuous precipitation of a pseudo-boehmite. Various modifications have been proposed, particularly with respect to the kind and concentration of mineral acid, the concentration of alkali aluminate, and the reaction steps.

A method for preparing alumina monohydrate by reaction between basic aluminum acetate and an acid has been described. (See Japanese Patent Publication No. 14701/1967.)

In the first mentioned method, the reaction rate is increased due to the use of mineral acid with the result that the resulting boehmite has relatively coarse crystals, is poorly dispersible, and has a pore volume below 1.5 cc/g, generally 0.2 to 1.0 cc/g. When these products are dispersed in water, the large particles precipitate rapidly, and when employed as a filler for polymers and the like, the resulting products are not homogeneous.

The hydrate prepared by the second method has fine particles which have excellent dispersibility. However, the process is quite expensive to operate.

Heat dehydration of an amorphous aluminum hydroxide gel or aluminum hydroxide trihydrate also gives boehmite. In this case, however, the form of resulting product is a reflection of the form of the starting material. Normally, the product is nothing but a featureless crystal.

The reaction between alkali aluminate and halohydrin is referred to in Japanese Patent Publication No. 30180/1968, wherein is shown that the resulting products are spherical particles with fine, needle-like, radially grown crystals.

THE INVENTION

It has now been discovered that by carrying out the foregoing reaction under specifically defined conditions, there is produced a pseudo-boehmite having improved fluidity, dispersibility, adsorbability and filterability compared with conventional products. The novel products are useful as carriers for catalysts, fillers such as are used in paints, pigments and other polymeric materials, and as base materials for composites.

Figure 1:
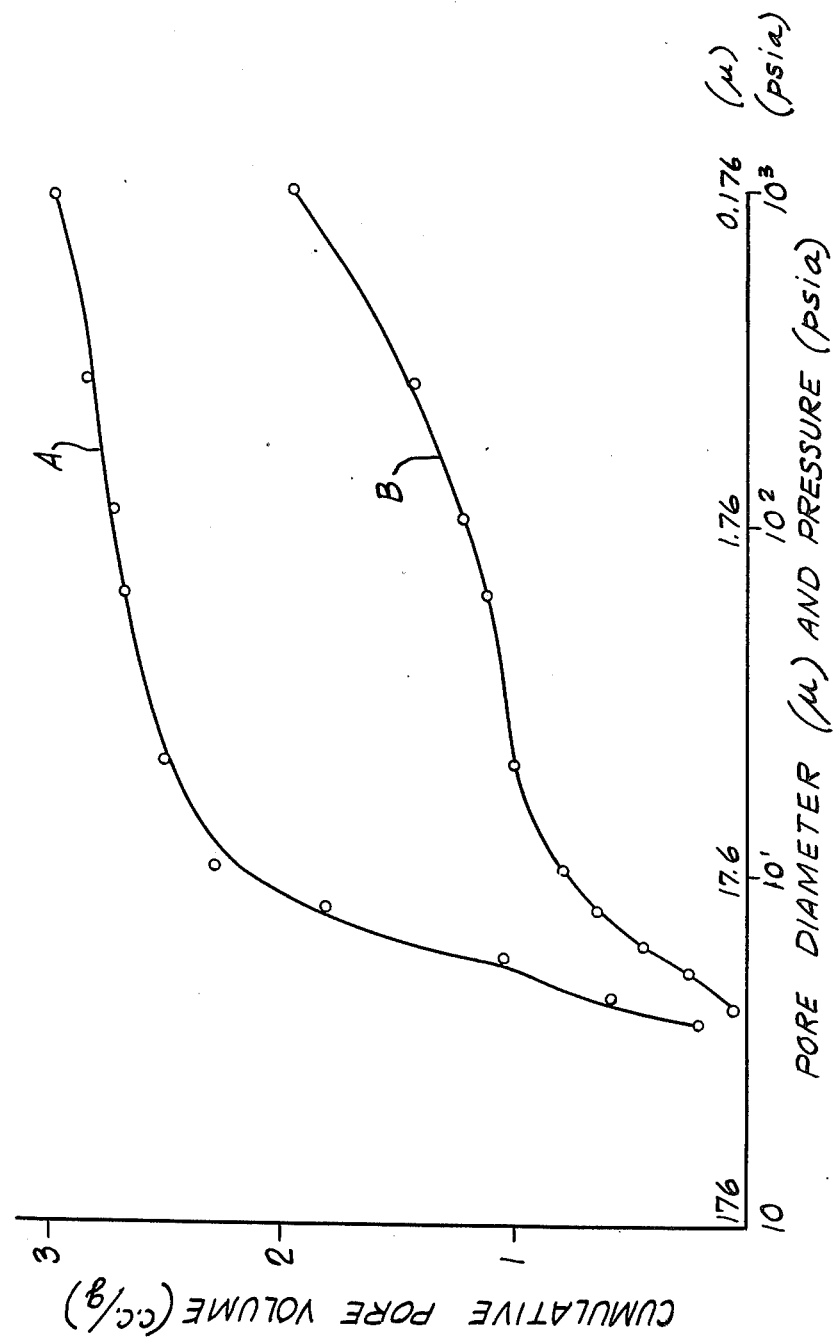
FIGS. 1 and 2 are graphs illustrating respectively a pore volume distribution of pseudo-boehmite produced by Example 3 over the pore diameter range 176 to 0.176μ and 176 to 0.0035μ respectively (designated A in the graphs) in comparison with those of a commercially available one (designated B in the graphs).

The pseudo-boehmite of this invention comprises an aggregate of crystals in the form of a thin film characterized by the following physical properties:

(a) bulk density of about 0.05 to 0.2 g/cc;
(b) oil absorption of about 2.5 to 6.0 cc/g; and
(c) specific surface area of about 200 to 500 m$^2$/g.

Additionally, the pore volume is remarkably large, being from about 2.0 cc/g to 7.0 cc/g over pore diameters in the range 176μ to 0.0035μ and 2.0 cc/g to 4.0 cc/g in the range 176μ to 0.176μ. The largest proportion of the products has a pore volume of from 3.5 cc/g to 7.0 cc/g in the range 176μ to 0.0035μ.

This should be contrasted with conventional alumina or hydrated alumina wherein the pore volume is normally from 0.1 to 1.8 cc/g, and in most cases from 0.3 to 1.5 cc/g in the 176μ to 0.0035μ range. According to the process described in Japanese Patent Public Disclosure No. 49699/1973, the resulting alumina has a pore volume of 1.0 to 2.75 cc/g in the same 176μ to 0.0035μ range.

Because of their large pore volumes, the products of this invention have an extremely low bulk density which ranges from 0.05 to 0.2 g/cc, in many cases 0.06 to 0.15 g/cc, although this will vary somewhat depending upon the conditions of production. The bulk density of pseudo-boehmite produced according to known methods has been not less than 0.12 g/cc. It has proved to be extremely difficult to reduce the bulk density. For example, in Japanese Patent Public Disclosure No. 49699/1973, there is obtained alumina having a bulk density of 0.12 to 0.4 g/cc.

The reason why the product of the present invention is so bulky appears to be attributable to its physically special configuration as will be described hereinafter.

The oil absorption capacity of the products of this invention is very high. The oil absorption depends upon the physical structure of powder and, in particular, it increases as the pore volume and the percentage of voids filled become larger. Generally, the lower the bulk density, the larger the oil absorption. Oil absorption of the products of this invention is much higher than that of commercially available products. Typically, it is from about 2.5 to 6.0 cc/g, usually 3.0 to 5.5 cc/g. This is equal to the oil absorption of specially prepared amorphous silica powders, such as Aerosol, Cabosil and gamma-Al$_2$O$_3$. So far as is presently known, boehmites having such large oil absorption capacitiess have not previously been produced.

'Pore volume' as used in this specification and claims refers to the total volume of pores having pore diameters in a defined range measured at a pressure of from 1 to 50,000 PSIa by the mercury penetration process using a porosimeter. The products of the invention have a pore volume of from 2.0 to 7.0 when determined over the pore diameter range of 176μ to 0.0035μ, and from 2.0 to 4.0 when determined over the range 176μ to 0.176μ.

The particle diameter of the products of this invention is relatively small and its distribution is sharp. Although the particle diameter varies depending upon production methods, as in conventional methods, the pseudo-boehmite of the present invention has an average particle diameter between 0.1 and 5 microns, in many cases between 0.3 and 3 microns. The distribution is within a narrow range. This is apparently due to the fact that the reaction by which the products of this invention are formed is entirely different from the reaction employed commercially.

The pseudo-boehmite of the present invention has excellent dispersibility, so that it is well dispersed or incorporated in water and other liquids as well as in polymeric substances. In contrast, conventional alumina, unless specially prepared, precipitates immediately after being dispersed in water.

The water permeability and filterability of the products of this invention are excellent. In conventional methods, the achievement of improved dispersibility inevitably results in poor filterability. As a result, the formation of crystals through filtration has been very difficult and expensive. For this reason, methods have been employed using solvents such as alcohol, etc., at a high temperature and pressure, or a gas phase method. In the present invention, a pseudo-boehmite in the form of fine particles having excellent dispersibility can be obtained through filtration without the need for such complex procedures. This is due to the configuration of the product as will be described hereinafter.

The products of this invention have excellent moldability. It is well known that efforts to obtain conventional alumina or hydrated alumina with sharp particle diameter distribution or relatively fine particle size result in the product having poor pressure molding properties. Therefore, molding of commercially available products is often impossible. Even when possible, the resulting shaped articles are often non-homogeneous due to lamination. The pseudo-boehmite of the present invention is not only moldable but also is effective as a binder of other powders when molded. A high thixotropy is considered to be one of the reasons why the products of the present invention are so effective.

Figure 4:
FIG. 4 is an electron microscopic photograph of pseudo-boehmite obtained by Example 4.

The pseudo-boehmite of the present invention is an aggregate of crystals in the form of a thin film as shown in the photograph of FIG. 4 (with needle-like crystals grown radially). This configuration is believed to contribute to the excellent characteristics of the products of this invention with respect to pore volume, bulk density, oil absorption, particle diameter, dispersibility, water permeability, filterability and moldability.

The purity of the products of this invention is especially high. Production of a high purity alumina has been accomplished by oxidation of metal aluminum, acid neutralization of aluminum chloride, gas phase procedures, and other methods. The neutralization method, however, results in poor filterability, which makes industrial-scale production difficult. The other methods are also disadvantageous because of increased production costs. The process of the present invention makes inexpensive production possible by utilization of a simple reaction, involving simple washing and filtration techniques.

The specific surface area of the products of this invention is large. The pseudo-boehmite according to the present invention has a specific surface area (B.E.T.) in the range of 200 to 500 m$^2$/g.

No psuedo-boehmite manifesting all of the characteristic features of the products of this invention have been previously described.

The synthesis of pseudo-boehmite is generally effected by reaction between an aluminum salt and ankali, by hydrolyzing aluminum amalgam, or by neutralizing alkali aluminate with acid, to form a substance in a gel state and thereafter heating and aging the substance in an aqueous solution. The crystals formed by such methods, however, are featureless and their utility is therefore limited. There is also a known method whereby a fibrous boehmite is produced by dispersion of alumina in the present of acetic acid, etc. (See Japanese Patent Publication No. 14292/1965.) Also, the method of producing a pseudo-boehmite by the reaction between sodium aluminate and nitric acid is known. (See Japanese Patent Public Disclosure No. 7164/1971.) None of the methods, however, produces a pseudo-boehmite having the characteristics properties of the products of the present invention.

The process of this invention, employs improvements in the starting materials, reaction conditions, reaction methods and after-treatment. Alkali aluminates and halohydrins are used as starting materials, so that the dehalogenation of halohydrin by alkali aluminate is carried out. In general, the reaction is in accordance with the following equation:

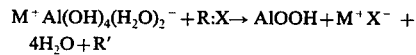

wherein $M^+Al(OH)_2(H_2O)_2^-$ represents the alkali aluminate; M is a metal; X is halogen; R:X is halohydrin; and R' is the reaction product wherein the halohydrin has undergone dehydrohalogenation or substitution. Although the rate of this reaction is very fast, this reaction is entirely different in reaction mechanism from the reaction with inorganic or organic acids. That is, the former reaction is dehydrohalogenation of a halohydrin or substitution of halogen by OH$^-$ group, while the latter is a mere neutralization reaction between molecules.

The concentration and the molar ratio of the starting material and the reaction temperature are important as the reaction conditions. A concentration of alkali aluminate of up to 25% by weight is used in the present invention, since appreciably higher concentrations result in the formation of coarse crystal particles. It is desirable to keep the molar ratio of halohydrin to alkali aluminate be as high as possible.

For effective reaction, the alkali aluminate and halohydrin are mixed together in advance. One may, for example, slowly add one of the starting materials to the other. One may also mix the starting materials all at once at or near the reaction temperature. Alternatively, the starting materials may be initially mixed at a high temperature. For best results, however, the premixing of the starting materials is effected at a temperature lower than the reaction temperature. This can be understood when consideration is given to the formation of crystal nucleus and an initial crystal growth rate.

The products of the inventions may be washed with an organic solvent as the last step of the preparation, if desired. This procedure is especially desirable if the products are to be used for fillers, pigments, or as components in coating materials. The preferred organic solvents are acetone and alkanols containing from 1 to 5 carbon atoms.

To obtain a high purity product, water washing is employed before the solvent wash.

The characteristics of the novel products of this invention are:

(a) Pore volume: 2.0–7.0 cc/g (3.5–7.0 cc/g), at pore diameter of 176µ to 0.0035µ.
(b) Pore volume: 2.0 to 4.0 cc/g, at pore diameter of 176µ to 0.176µ.
(c) Bulk density: 0.05–0.2 g/cc (0.06–0.15 g/cc).
(d) Oil absorption: 2.5–6.0 cc/g (3.0–6.0 cc/g).
(e) Particle diameter: 0.15–5.0µ (0.3–3.0µ) (average).
(f) Configuration: thin, film-like.
(g) Specific surface area: 200–500 $m^2/g$ (300–500 $m^2/g$).

The numerals in parentheses represent physical properties of those crystals which are found in the highest proportion.

A characteristic example of the present invention is a novel pseudo-boehmite having:

(a) a pore volume of about 3.5 to 7.0 cc/g; at 176µ to 0.0035µ.
(b) a bulk density of about 0.06 to 0.15 g/cc.
(c) an oil absorption of about 3.0 to 6.0 cc/g.
(d) a specific surface area of about 300 to 500 $m^2/g$.

The most characteristic example of the present invention is a novel pseudo-boehmite having:

(a) a pore volume of about 3.5 to 7.0 cc/g, at 176µ to 0.0035µ.
(b) a bulk density of about 0.06 to 0.12 g/cc.
(c) an oil absorption of about 3.0 to 6.0 cc/g.
(d) a specific surface area of about 350 to 500 $m^2/g$ (especially 400 to 500 $m^2/g$).

Accordingly, the present invention provides (I) a pseudo-boehmite having (a) a pore volume of about 2.0 to 7.0 g/cc at 176µ to 0.0035µ and 2.0 to 4.0 g/cc at 176µ to 0.176µ, (b) a bulk density of about 0.05 to 0.2 g/cc, (c) an oil absorption of about 2.5 to 6.0 cc/g, and (d) a specific surface area of about 200 to 500 $m^2/g$, and (II) a process for producing a novel pseudo-boehmite having excellent dispersibility which comprises premixing an aqueous solution of alkali aluminate having a concentration of not more than 25% by weight with halohydrin so that the molar ratio of halohydrin to alkali aluminate is not less than 0.9, subjecting the resulting mixture to reaction at normal temperature and subsequent reaction at a temperature not lower than 50° C., and, if desired, treating the resulting precipitate with an organic solvent.

As an alkali aluminate, sodium aluminate and potassium aluminate may be used; those wherein the atomic ratio of alkali to aluminum is in the range of 1–1.5 to 1 may be employed.

Examples of halohydrin which may be used include ethylene chlorohydrin, propylene chlorohydrin, epichlorohydrin, trimethylene chlorohydrin, glycerol mono- or dichlorohydrin, or 1-hydroxy-2-chloropropyl-methacrylate.

The concentration of an aqueous solution of alkali aluminate used in the reaction is 0.1 to 25% by weight, preferably 1 to 20% by weight, and most preferably 5 to 15% by weight. A concentration appreciably above 25% by weight results in large crystals, small pore volume and poor dispersibility, and is thus undesirable. The term "concentration" referred to herein denotes values calculated without including surplus alkali. The amount, i.e. molar ratio, of halohydrin to alkali aluminate is 0.5 to 20, preferably 0.8 to 20, and most preferably 0.9 to 10. It is desirable that the lower limit of molar ratio be adjusted so that the reaction may be completed, taking the amount of excess alkali into consideration. It is also recommended from an economical point of view that excess alkali be neutralized with mineral acid such as hydrochloric acid or with gaseous carbon dioxide. A molar ratio of at least 1 is preferably for higher yield of dehydrated alumina. Organic substances in the filtered waste liquor after reaction are decreased if the molar ratio is less than 1 for 100% conversion of halohydrin. In this case, the molar ratio ranges from 0.5 to 1.0, preferably as close to 1.0 as possible, and most preferably from 0.8 to 1.0. Although there is no upper limit of the molar ratio, values not more than 20 are most economical. In view of the properties of the resulting pseudo-boehmite, the ratio of 2–10 is preferable; in general, the higher ratio, the larger pore volume, so that there is obtained a powder having a low bulk density and excellent fluidite. Even if the molar ratio is 1 or lower, however, there is produced a hydrated alumina having excellent physical properties by adjusting the concentration of alkali aluminate or the reaction time in the first stage which is conducted at a low temperature.

In initiating the reaction, it is important to mix aqueous solution of alkali aluminate and halohydrin in advance. Such a premixing is herein defined as follows, and designated a first-stage reaction. That is, the first-stage reaction is such that an aqueous solution of alkali aluminate and halohydrin are mixed together at a temperature lower than the reaction temperature. Both the starting materials are fed continuously through a pipe into the mixing chamber by a pump or gravity and, after thorough mixing, they are introduced into the reactor. In the case of batch reaction, both the liquids are fed into the mixing chamber, mixed together, then allowed to stand for the selected period of time. The reaction mixture is thereafter heated in place or introduced into another reactor maintained at an elevated temperature. The mixing temperature is preferably lower than the reaction temperature, i.e. 50° C., and more preferably from −10° C. to 50° C. In practice, it is usually not necessary to supply heat. The time required from the mixing to the initiation of reaction varies depending upon the size of the reactor, the amount of production and the liquid temperature of the mix, but 5 seconds to 10 hours, preferably 5 seconds to 1 hour is normally sufficient. An aqueous solution of alkali aluminate is heated to the reaction temperature, and the halohydrin is added as rapidly as possible with violent stirring.

The reaction may be in either a homogeneous or heterogeneous system. In a heterogeneous system, for example, if epichlorohydrin is used, a homogeneous system may be produced by the addition of a common solvent such as alcohol.

A suitable reaction temperature is not lower than 50° C., particularly 50° C. to 100° C., and preferably 60° C. to 90° C. At temperatures below 50° C., large amounts of gelled products are produced, and this is not desirable for optimum production.

The pseudo-boehmite of the present invention is different from boehmite. In boehmite, the spacing of the minimum angle (020) is 6.15 to 6.2A, while in pseudo-boehmite, is 6.5 to 6.8A, with no crystalline development and broad X-ray diffraction.

The pseudo-boehmite compositions of the present invention may contain from about 30% to 100% pseudo-boehmite.

EXAMPLE 1

In a four-necked, 2 liter flask equipped with a stirrer and a thermometer were placed 13.5 g. (0.123 mole) of sodium aluminate (the molar ratio of $Al_2O_3$:$Na_2O$ being 1:1.144, with the purity of 75% as sodium aluminate, as is the case with all the following working Examples and Comparative Examples) and 1000 c.c. of water, to give a homogeneous solution. To the solution was added at one time 19.8 g. (0.246 mole) of ethylene chlorohydrin at 20° C. with thorough stirring. After 5 minutes, the flask was placed in a water bath at 50° C. and the mixture was heated with stirring for one hour. After cooling, the resulting precipitate was filtered off and then washed with about 10 liters of water. Then, the precipitate was allowed to be suspended in about 1 liter of acetone, and subjected to stirring, filtration by means of suction and then thorough washing with about 1 liter of acetone, followed by drying at 100°–150° C. for 2–5 hours. As a result, there was obtained a pseudo-boehmite having the following physical properties:

Pore volume: 5.0 cc/g. (0.0035–176μ) 2.6 cc/g. (0.176–176μ)
Bulk density: 0.07 g/cc.
Oil absorption: 3.2 cc/g.
Average particle diameter: 1.1μ
Specific surface area: 370 m²/g.

EXAMPLE 2

In a four-necked, 2 liter flask equipped with a stirrer and a thermometer was placed 13.5 g. (0.123 mole) of sodium aluminate, which were dissolved in 1000 c.c. of water. To the resulting solution were added at one time 19.8 g. (0.246 mole) of ethylene chlorohydrin at 20° C. with stirring. After stirring at such temperature for 30 minutes, the flask was placed in a water bath at 50° C. and the mixture was heated with stirring for 1 hour. After cooling, the resulting precipitate was filtered off and then washed with about 10 liters of water. Then, the precipitate was allowed to be suspended in about 1 liter of methanol, and subjected to thorough stirring, filtration by means of suction and then washing with about 1 liter of methanol, followed by drying at 100°–150° C. for 2–5 hours. Physical properties of the resulting pseudo-boehmite are as follows:

Pore volume: 5.0 cc/g (0.0035–176μ). 2.7 cc/g (0.176–176μ).
Bulk density: 0.07 g/cc.
Oil absorption: 3.6 cc/g.
Average particle diameter: 0.7μ
Specific surface area: 375 m²/g.

EXAMPLE 3

In a four-necked, 2 liter flask equipped with a stirrer and a thermometer were placed 148 g. (1.355 moles) of sodium aluminate and 1000 c.c. of water, to give a homogeneous solution. To the solution were added at one time 218 g. (2.711 moles) of ethylene chlorohydrin at 20° C. with stirring. After stirring at such temperature for 30 minutes, the flask was placed in a water bath at 70° C. and the mixture was heated with stirring for one hour. Then, the after-treatment in Example 1 was repeated.

Physical properties of the resulting pseudo-boehmite are as follows:

Pore volume: 6.2 cc/g. (0.0035–176μ). 3.0 cc/g. (0.176–176μ).
Bulk density: 0.10 g/cc.
Oil absorption: 4.0 cc/g.
Average particle diameter: 2.3μ
Specific surface area: 400 m²/g.

Figure 2:
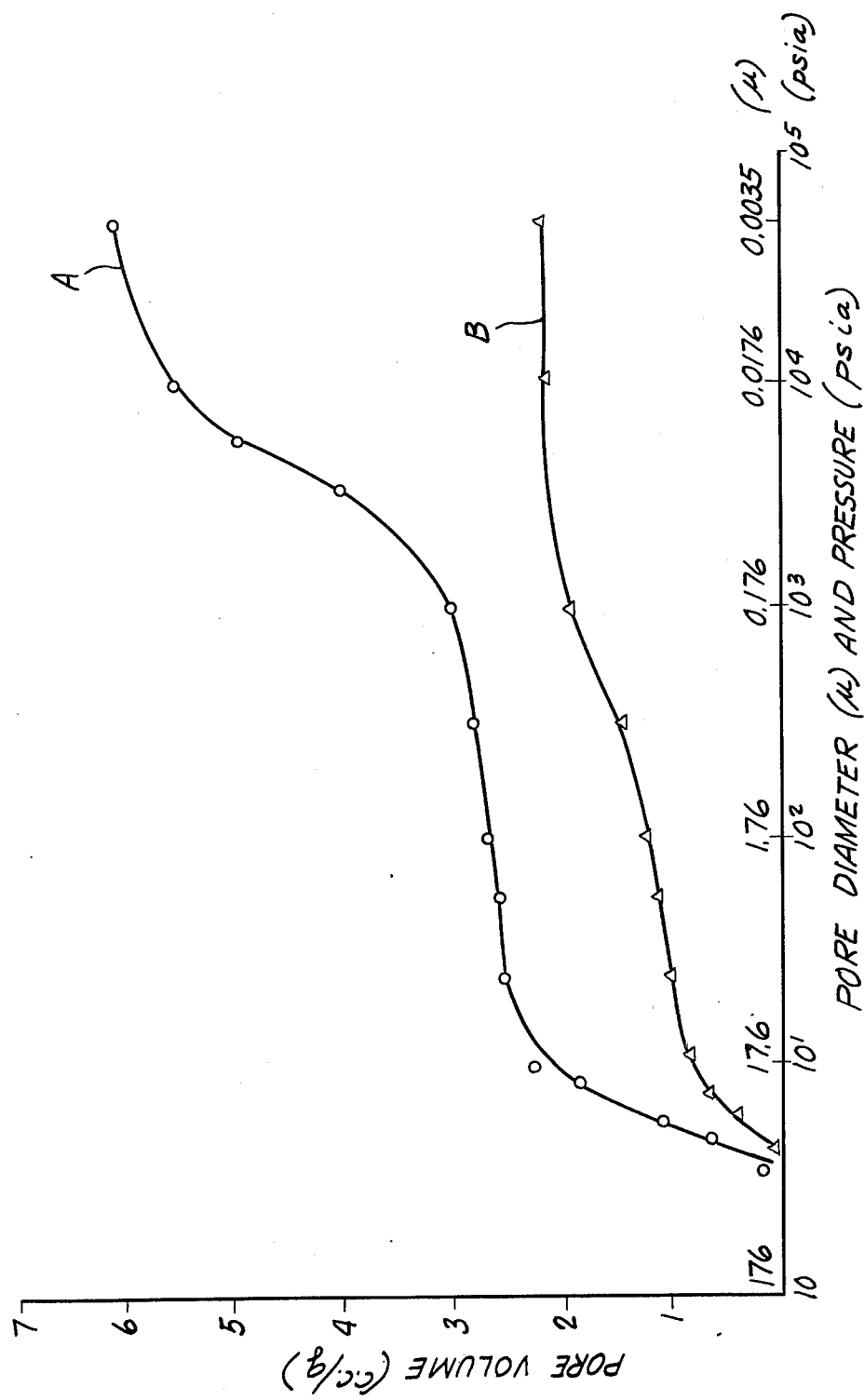
Figure 3:
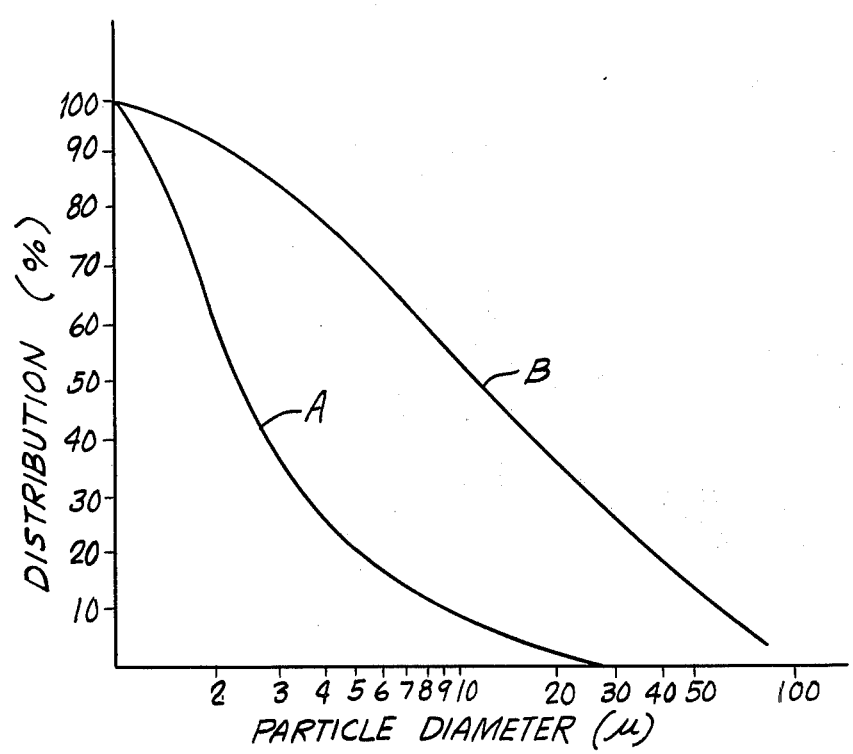
FIG. 3 is a graph showing the particle diameter distribution of the product of Example 3 (A) compared with the same commercially available product (B).

The pore distribution and particle diameter distribution of this pseudo-boehmite are shown in FIGS. 1, 2 and 3, respectively, to which graph A in the drawings corresponds. Graph B represents the pore distribution and particle diameter distribution of a commercially available product.

EXAMPLE 4

In a four-necked, 3 liter flask equipped with a stirrer and a thermometer were placed 148 g. (1.355 moles) of sodium aluminate and 1000 c.c. of water, to give a homogeneous solution. To the solution were added at one time 1091 g. (13.555 moles) of ethylene chlorohydrin at 20° C. with stirring. After 5 minutes had elapsed, the flask was placed in a water bath at 70° C. and the mixture was heated with stirring for one hour. Then, the after-treatment in Example 1 was repeated.

Physical properties of the resulting pseudo-boehmite are as follows:

Pore volume: 6.4 cc/g. (0.0035–176μ). 3.6 cc/g. (0.176–176μ).
Bulk density: 0.06 g/cc.
Oil absorption: 5.3 cc/g.
Average particle diameter: 1.5μ
Specific surface area: 480 m²/g.

An electron microscopic photograph of this pseudo-boehmite is shown in FIG. 4.

EXAMPLE 5

In a four-necked, 3 liter flask equipped with a stirrer and a thermometer were placed 148 g. (1.355 moles) of sodium aluminate and 1000 c.c. of water, to give a homogeneous solution. To the solution were added 1091 g. (13.555 moles) of ethylene chlorohydrin at 20° C. with stirring. After stirring at such temperature for 30 minutes, the flask was placed in a water bath at 90° C. and the mixture was stirred for 30 minutes. Then the after-treatment in Example 1 was repeated.

Physical properties of the resulting pseudo-boehmite are as follows:

Pore volume: 6.4 cc/g. (0.0035–176μ). 3.3 cc/g. (0.176–176μ).
Bulk density: 0.10 g/cc.
Oil absorption: 4.6 cc/g.
Average particle diameter: 1.6μ
Specific surface area: 460 m²/g.

EXAMPLE 6

In a four-necked, 2 liter flask equipped with a stirrer and a thermometer were placed 148 g. (1.355 moles) of sodium aluminate and 1000 c.c. of water, to give a homogeneous solution. To the solution were added at one time 641 g. (6.778 moles) of propylene chlorohydrin (2-chloropropyl alcohol) at 30° C. with stirring. After stirring at such temperature for one hour, the flask was placed in a water bath at 70° C. Then the after-treatment in Example 1 was repeated.

Physical properties of the resulting pseudo-boehmite are as follows:

Pore volume: 6.0 cc/g. (0.0035–176μ). 3.0 cc/g (0.176–176μ).
Bulk density: 0.09 g/cc.
Oil absorption: 4.2 cc/g.
Average particle diameter: 1.6μ
Specific surface area: 420 m²/g.

EXAMPLE 7

In a four-necked, 2 liter flask equipped with a stirrer and a thermometer were placed 333 g. (3.05 moles) of sodium aluminate and 1000 c.c. of water, to give a homogeneous solution. To the solution was added at one time 787 g. (6.10 moles) of α-dichlorohydrin at 10° C. with stirring. After stirring at such temperature for 30 minutes, the flask was placed in a water bath at 70° C. and the mixture was heated with stirring for 1 hour. After cooling, the resulting precipitate was filtered off and then washed with about 200 c.c. of acetone for the removal of non-reacted α-dichlorohydrin. Then the after-treatment in Example 2 was repeated.

Physical properties of the resulting pseudo-boehmite are as follows:

Pore volume: 6.2 cc/g. (0.0035–176μ). 3.1 cc/g (0.176–176μ).
Bulk density: 0.11 g/cc.
Oil absorption: 4.3 cc/g.
Average particle diameter: 4.0μ
Specific surface area: 380 m²/g.

EXAMPLE 8

Figure 5:
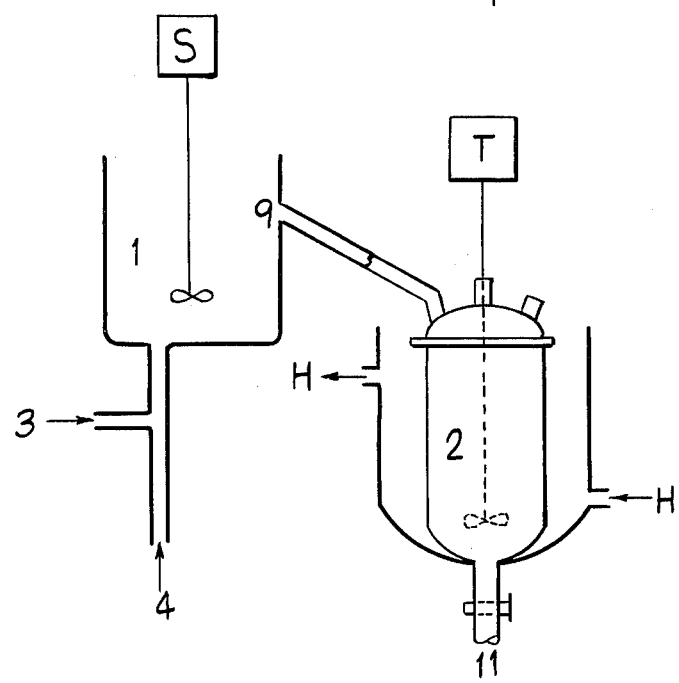
FIGS. 5 and 6 are illustrative diagrams showing the reactors used in Examples 8 and 9, respectively.

The reaction was conducted using the apparatus as shown in FIG. 5. Into a 1 liter mixing chamber 1 held at 20° C. were pumped an aqueous solution of sodium aluminate (10% by weight of sodium aluminate) and ethylene chlorohydrin respectively through pipes 3 and 4 and respectively at the rate of 14.3 c.c. (14.9 g.) and 2.37 c.c. (2.84 g.) per minute, which were mixed together under thorough stirring with a stirrer S while continuously flowing out through pipe 9. (Average residence time in the mixing chamber 1 was one hour.) The overflow liquid was passed through the pipe 9 into a 0.5 liter reactor having a stirrer T held at 70° C. and then passed out continuously through pipe 11 at the rate of 33.3 c.c. (35.5 g.) per minute. (Average residence time in the reactor 2 was 30 minutes.) The said reactor was heated by a heat transfer medium H. Then the after-treatment in Example 1 was repeated.

Physical properties of the resulting pseudo-boehmite are as follows:

Pore volume: 0.5.1 c.c./g. (0.0035–176μ). 3.3 c.c./g (0.176–176μ).
Bulk density: 0.12 g/c.c.
Oil absorption: 4.1 c.c./g.
Average particle diameter: 2.0μ
Specific surface area: 410 m²/g.

EXAMPLE 9

Figure 6:
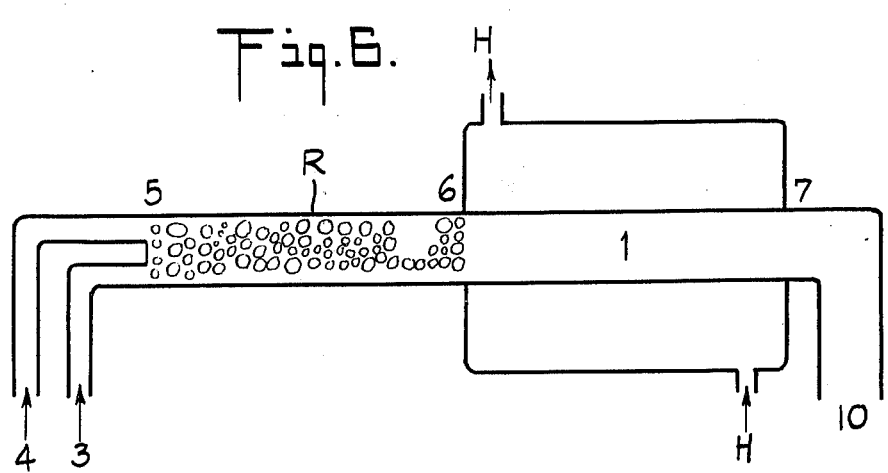

The reaction was conducted using the apparatus as shown in FIG. 6. Into a pipe reactor 1 were pumped an aqueous solution of sodium aluminate (10% by weight of sodium aluminate) and ethylene chlorohydrin respectively through pipes 3 and 4 and respectively at the rate of 14.3 c.c. (14.9 g.) and 2.37 c.c. (2.84 g.) per minute, which were thoroughly mixed together in the mixing zone between 5 and 6. (The mixing zone between 5 and 6 was 50 cm. in length and was filled with Raschig ring R; average residence time therein was fifteen minutes.) The resulting mixture was passed into the reaction zone between 6 and 7 and held at 70° C., where it was reacted. (The reaction zone between 6 and 7 was 50 cm. in length, and average residence time therein was fifteen minutes.) The reaction solution was continuously passed out through an outlet 10. The said reaction zone was heated by a heat transfer medium H. Then the after-treatment in Example 1 was repeated.

Physical properties of the resulting pseudo-boehmite are as follows:

Pore volume: 5.1 c.c./g. (0.0035–176μ). 3.4 c.c./g. (0.176–176μ).
Bulk density: 0.11 g/c.c.
Oil absorption: 3.9 c.c./g.
Average particle diameter: 2.3μ
Specific surface area: 415 m²/g.

EXAMPLE 10

In a four-necked, 2 liter flask equipped with a stirrer and a thermometer was placed 100 g. of sodium aluminate and 1000 c.c. of water, to give a homogeneous solution. To the solution were added at one time 66.27 g. (0.823 mole) of ethylene chlorohydrin (the molar ratio of ethylene chlorohydrin to sodium aluminate being 0.9) at 20° C. with stirring. After stirring at such temperature for 30 minutes, the flask was placed in a water bath at 80° C. and the mixture was subjected to stirring for one hour. After cooling, the resulting precipitate was filtered off and then washed with about 10 liters of water. Thereafter, the precipitate was suspended in about 1 liters of n-butanol and then subjected to stirring, filtration by means of suction and thorough washing with about 1 liter of n-butanol, followed by drying at 100°–150° C. for 4 hours.

Physical properties of the resulting pseudo-boehmite are as follows:

Pore volume: 5.8 c.c./g. (0.0035–176μ). 2.5 c.c./g. (0.176–176μ).
Bulk density: 0.10 g/c.c.
Oil absorption: 4.0 c.c./g.
Average particle diameter: 3.2μ
Specific surface area: 330 m²/g.

EXAMPLE 11

In a three-necked, 4 liter flask equipped with a stirrer and a thermometer were placed 328 g. (3.0 moles) of sodium aluminate and 1000 c.c. of water, to give a homogeneous solution. To the solution were added at one time 1,690 g. (21.0 moles) of ethylene chlorohydrin at 20° C. under with stirring. After stirring at this temperature for 2 minutes, the temperature was raised to 75° C. during a period of 20 minutes and maintained at 75° C.

for one hour with continued stirring. After cooling, the precipitate which formed was collected by filtration, washed with about 10 liters of water and subsequently dried by spray drying at 120° C. for 6 hours.

Physical properties of the resulting pseudo-boehmite are as follows:

Pore volume: 4.0 c.c./g. (0.0035–176μ).
Bulk density: 0.19 g./c.c.
Oil absorption: 3.1 c.c./g.
Average particle diameter: 3.7μ
Specific surface area: 365 m²/g.

COMPARATIVE EXAMPLE 1

In a three-necked, 2 liter flask equipped with a stirrer and a thermometer were placed 148 g. (1.355 moles) of sodium aluminate and 1000 c.c. of water, to give a homogeneous solution. To the solution were added at one time 218 g. (2.711 moles) of ethylene chlorohydrin at 70° C. under with violent stirring. Stirring was continued for one hour at such temperature. Then the after-treatment in Example 1 was repeated.

Physical properties of the resulting pseudo-boehmite are as follows:

Pore volume: 1.55 c.c./g. (0.176–176μ).
Bulk density: 0.21 g./c.c.
Oil absorption: 2.9 c.c./g.
Average particle diameter: 10.3μ
Specific surface area: 260 m²/g.

COMPARATIVE EXAMPLE 2

The experimental conditions and after-treatment of Example 9 were repeated with the exception that the mixture zone between 5 and 6 and the reaction zone between 6 and 7 were 0 and 1 m. in length, respectively.

Physical properties of the resulting pseudo-boehmite are as follows:

Pore volume: 0.36 c.c./g. (0.176–176μ).
Bulk density: 0.46 g/c.c.
Oil absorption: 2.7 c.c./g.
Average particle diameter: 39.5μ
Specific surface area: 210 m²/g.

COMPARATIVE EXAMPLE 3

Physical properties of a commercially available alumina were as follows:

| Physical Properties | Alumina | γ-alumina | Gibbsite | Pseudo-boehmite of K Company |
| --- | --- | --- | --- | --- |
| Pore volume (c.c./g.) | | 0.64 | 1.1 | 2.1 (0.0035–176μ) 1.9 (0.176–176μ) |
| Bulk density (g./c.c.) | | 0.9 | 0.25 | 0.18 |
| Oil absorption (c.c./g.) | | 0.66 | 0.55 | 2.3 |
| Average particle diameter (μ) | | 45 | 0.6 | 10 |
| Specific surface area (m²/g.) | | 300 | 16 | 330 |

What is claimed is:

1. A process for the production of a pseudo-boehmite product which comprises initially mixing an alkali aluminate and a halohydrin selected from the gorup consisting of ethylene chlorohydrin, propylene chlorohydrin, epichlorohydrin, trimethylene chlorohydrin, glycerol monochlorohydrin, glycerol dichlorohydrin, and 1-hydroxy-2-chloropropyl-methacrylate for a period of 5 seconds to 10 hours at a temperature of from −10° C. to 50° C., the molar ratio of halohydrin to alkali aluminate being from 0.8 to 20, the concentration of alkali aluminate being up to 25% by weight, and thereafter raising the temperature of the mixture to from 50° C. to 100° C. to effect precipitation of the desired pseudo-boehmite; said pseudo-boehmite characterized by the following physical properties:

(a) bulk density, 0.05 to 0.2 g/cc;
(b) oil absorption, 2.5 to 6.0 cc/g;
(c) specific surface area, 200 to 500 m²/g;
(d) pore volume, 2.0 to 7.0 cc/g (0.0035μ–176μ);
(e) Pore volume, 2.0 to 4.0 cc/g (0.176μ–176μ).

2. A process as in claim 1 wherein the precipitated pseudo-boehmite is washed with an organic solvent selected from a group consisting of acetone and an alcohol having from 1 to 5 carbon atoms.

3. A process as claimed in claim 1 wherein precipitation is effected at a temperature of 60° C. to 90° C.

4. A process as claimed in claim 1 wherein the alkali aluminate is sodium aluminate or potassium aluminate.

5. A process as claimed in claim 1 wherein the alkali aluminate has an atomic ratio of alkali to aluminum of 1:1 to 1.5:1 and contains excess alkali.

6. A process as claimed in claim 1 wherein the concentration of alkali aluminate is from 1 to 20% by weight.

7. A process as claimed in claim 1 wherein the concentration of alkali aluminate is from 5 to 15% by weight.

8. A process as claimed in claim 1 wherein the molar ratio of halohydrin to alkali aluminate is from 0.8 to 20.

9. A process as claimed in claim 1 wherein the molar ratio of halohydrin to alkali aluminate is from 0.9 to 10.

10. A process as in claim 1 wherein excess alkali, when present, is neutralized with mineral acid or gaseous carbon dioxide.

* * * * *